(12) United States Patent
Oeter et al.

(10) Patent No.: US 6,939,527 B2
(45) Date of Patent: Sep. 6, 2005

(54) METHOD FOR THE PURIFICATION OF HYDROGEN PEROXIDE SOLUTIONS

(75) Inventors: Dietmar Oeter, Gross-Zimmern (DE); Claus Dusemund, Holland Hill (SG); Ewald Neumann, Erfelden (DE); Klaus Freissler, Stockstadt (DE); Martin Hostalek, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 176 days.

(21) Appl. No.: 10/296,172

(22) PCT Filed: Mar. 29, 2001

(86) PCT No.: PCT/EP01/03584

§ 371 (c)(1),
(2), (4) Date: Nov. 22, 2002

(87) PCT Pub. No.: WO01/92149

PCT Pub. Date: Dec. 6, 2001

(65) Prior Publication Data

US 2003/0165420 A1 Sep. 4, 2003

(30) Foreign Application Priority Data

May 27, 2000 (DE) .......................................... 100 26 363

(51) Int. Cl.$^7$ ............................................... C01B 15/01
(52) U.S. Cl. ..................................................... 423/584
(58) Field of Search ........................................ 423/584

(56) References Cited

U.S. PATENT DOCUMENTS

| | | | | |
|---|---|---|---|---|
| 3,294,488 A | * | 12/1966 | Dunlop et al. | 423/584 |
| 3,297,404 A | * | 1/1967 | Elliott et al. | 423/584 |
| 3,556,727 A | | 1/1971 | Thirion | |
| 4,792,403 A | * | 12/1988 | Togo et al. | 210/692 |
| 4,999,179 A | * | 3/1991 | Sugihara et al. | 423/584 |
| 5,055,286 A | * | 10/1991 | Watanabe et al. | 423/584 |
| 5,232,680 A | | 8/1993 | Honig et al. | |
| 5,268,160 A | | 12/1993 | Albal et al. | |
| 5,851,505 A | * | 12/1998 | Nishide et al. | 423/584 |
| 6,054,109 A | * | 4/2000 | Saito et al. | 423/584 |

FOREIGN PATENT DOCUMENTS

| | | |
|---|---|---|
| DE | 4214075 | 12/1992 |
| EP | 0502466 | 9/1992 |
| EP | 0835842 | 4/1998 |

* cited by examiner

*Primary Examiner*—Wayne A. Langel
(74) *Attorney, Agent, or Firm*—Millen White Zelano & Branigan, P.C.

(57) ABSTRACT

The invention relates to a novel chromatographic process for the further purification of hydrogen peroxide solutions, giving high-purity solutions which can be employed in semiconductor technology under today's high purity requirements.

20 Claims, No Drawings

METHOD FOR THE PURIFICATION OF HYDROGEN PEROXIDE SOLUTIONS

The invention relates to a novel process for the further purification of hydrogen peroxide solutions which gives high-purity solutions that can be employed in semiconductor technology under today's high purity requirements.

In the production of highly integrated electric circuits, extremely high purity requirements are placed on the chemicals used. While the production of 1 megabit chips tolerates a chemical quality with impurities in the low ppm region, the production of 4 to 16 megabit chips requires chemical qualities with a maximum impurity level in the range below 10 ppb.

One of the key chemicals in chip production which has to meet these purity requirements is hydrogen peroxide. Since the latter is prepared virtually exclusively by the anthraquinone process and is usually purified and concentrated by rectification in aluminium or stainless-steel columns, it does not have the requisite purity. Due to contact with the plant parts, the distillate is contaminated, in particular, with aluminium or also other metals. In addition, it comprises residues of organic carbon compounds ("organic C"), such as solvents (alcohols, ketones, aliphatic hydrocarbons and acids), and of anthraquinone derivatives as a consequence of the process. For use in microelectronics, the hydrogen peroxide must therefore be subjected to effective post-treatment in order to reduce the cation, anion and carbon content to the requisite purity level.

Purification of hydrogen peroxide solutions by distillation alone does not achieve the requisite purity with respect to metallic impurities and carbon. For example, the solutions comprise readily volatile or steam-volatile organic carbon compounds from the anthraquinone process, which cannot be separated off in a simple manner by distillation. The content of dissolved organic carbon in the hydrogen peroxide can have values of up to 150 mg/l. However, metal ions and carbon impurities in the hydrogen peroxide have a particularly interfering effect in the production of microchips, these impurities having an all the more critical effect the more highly integrated the chips to be produced. There has therefore been no lack of attempts in the prior art to remove the impurities from the hydrogen peroxide by post-treatment with cation and/or anion exchangers.

Ion-exchanging materials which have been proposed for this purpose are ring-substituted aromatic hydrocarbon cation exchanger resins for the removal of cations and aromatic hydrocarbon anion exchanger resins containing tertiary amino or ammonium groups or pyridine rings for the removal of anions. The functional groups present in these ion exchanger resins often make the ion exchanger resins so sensitive to oxidation that the purification of hydrogen peroxide using these ion exchanger resins has to be carried out at relatively low temperatures of about 0° C. and with particular precautionary measures.

In order to circumvent the problem of reaction with oxidation-sensitive groups, U.S. Pat. No. 5,268,160 proposes further purification using nonionic organic hydrophobic adsorber resins based on crosslinked polystyrene resins. However, this only gives hydrogen peroxide solutions which comprise a multiple of the tolerated impurities and are therefore not suitable for use in chip production in accordance with today's standards.

The high oxidation sensitivity of ion exchanger resins is attributable to the fact that, in the presence of heavy metals, such as, for example, Fe or Cu, etc., hydrogen peroxide is able to form hazardous hydroxyl free radicals, which oxidatively attack the carbon skeleton of the ion exchanger and are able to form readily decomposable epoxides or hydroperoxides therewith. The epoxides or hydroperoxides formed can decompose not only explosively, but under certain circumstances even in the manner of a detonation. The use of cation exchangers or anion exchangers for the purification of hydrogen peroxide solutions is thus problematic and requires particular care.

In order to circumvent this problem, EP-A1-0 502 466 and DE-A1-38 22 348 A1 have described processes for the further purification of hydrogen peroxide solutions in which metal ions present after purification by distillation are separated off from corresponding solutions by means of chelating agents and by means of non-ion-exchanging polymeric adsorbents based on styrene-divinylbenzene copolymers. However, this process is afflicted with the disadvantage that undesired chemicals must again be added to a pre-purified solution and subsequently have to be separated off again.

DE-A1-42 14 075 discloses a process in which the hydrogen peroxide solutions to be purified are treated with an anion exchanger and a nonionic adsorber resin in order to separate off organic impurities. In this process, the hydrogen peroxide solutions to be purified are treated with a cationic resin in the acidic form and subsequently with a medium-strength anionic resin in the basic form at 0° C. This is followed by treatment with an adsorber resin having a microreticular structure, i.e. with a nonionic resin. It has been found that hydrogen peroxide solutions treated in this way no longer satisfy today's requirements of the semiconductor industry, since the concentration of the organic impurities still present in the solutions is too high.

U.S. Pat. No. 4,879,048 again discloses a process for the further purification of hydrogen peroxide solutions by reverse osmosis. However, the life of the semipermeable membrane causes problems. In addition, today's purity requirements are not met.

The object was therefore to provide a process for the further purification of hydrogen peroxide solutions which is simple to carry out and which enables the concentration of organic impurities (TOC) to be reduced to less than 5 ppm and at the same time allows interfering metal ions to be separated off.

The object according to the invention is achieved by a process for the further purification of hydrogen peroxide solutions by treating the hydrogen peroxide solutions to be purified, which have concentrations in the range 5–59%,
 a) with an anion exchanger resin,
 b) with a nonionic adsorber resin in the form of a hydrophobic aromatic, crosslinked polymer having a macroporous structure, and
 c) with a neutral adsorber resin from the group consisting of the styrene-divinylbenzene resins having a highly macroporous structure, the latter having been formed by pyrolysis treatment of the resin,
with the proviso that the treatment with the adsorber or exchanger resins can be carried out in any desired sequence, but with the condition that the treatment with the neutral adsorber resin takes place in the final step.

The anion exchanger resin selected in accordance with the invention can be a resin from the group consisting of strongly or weakly basic styrene-divinylbenzene resins containing quaternary ammonium groups as functional groups and strongly or weakly basic styrene-divinylbenzene resins containing tertiary amino groups as functional groups.

The nonionic adsorber resin used in accordance with the invention is an aromatic crosslinked polymer having a macroporous structure, in particular selected from the group consisting of styrene-divinylbenzene resins having a macroporous structure and a large surface area.

In an additional purification step of the process according to the invention, the neutral adsorber resin used is a resin selected from the group consisting of styrene-divinylbenzene resins having a highly macroporous structure and a moderate surface area.

In order to carry out the process, the hydrogen peroxide solution to be treated is passed, in accordance with the invention, through chromatography columns connected in series at a flow density of from 0.2 l/h cm$^2$ to 1.0 l/h cm$^2$, in particular from 0.5 to 0.7 l/h cm$^2$,.

If the further purification is carried out in fluidized beds connected in series, a residence time in the range from 0.008 to 20.0 min is advantageous.

The further purification of these hydrogen peroxide solutions is carried out at temperatures of from 15 to 25° C., preferably at 20° C.

The process is particularly advantageous and economical under continuous conditions. However, it can also be carried out in batch operation.

The object can also be achieved in accordance with the invention by a corresponding process in which the hydrogen peroxide solution to be purified is passed into fluidized beds connected in series which comprise, separately from one another, a) an anion exchanger resin,
b) a nonionic adsorber resin, and
c) a neutral adsorber resin, with a residence time of from 0.0008 to 20.0 min, where the hydrogen peroxide solution to be further purified is in each case separated off from the exchanger or adsorber resins by filtration.

The further purification in fluidized beds connected in series can, in accordance with the invention, be carried out at temperatures of from 0 to 20° C., in particular at from 0 to 10° C., and can be carried out either in batch operation or continuously. As in the case of further purification in columns, from 5 to 59% hydrogen peroxide solutions can be employed in the process according to the invention.

The hydrogen peroxide solutions employed in the process according to the invention are solutions which have been pre-purified by distillation and comprise, as impurities, only very small amounts of ionic inorganic impurities, such as, for example, metal cations Al, Fe, Zn, etc., or anions, such as $NO_3^-$, $PO_4^{2-}$, etc., and organic impurities as a consequence of the preparation.

Experiments have shown that up to 95% of the undesired organic impurities present can be removed without difficulties from corresponding 5 to 59% hydrogen peroxide solutions by successive chromatographic treatment with anion exchanger resins, nonionic adsorber resins and neutral adsorber resins. For example, the TOC content of a 50% hydrogen peroxide solution can be reduced from 40 ppm to less than 5 ppm by the process according to the invention, so that the resultant solution has a purity which is absolutely necessary for use in the semiconductor industry under current requirements.

It has been found that the reduction in the TOC content only takes place due to the treatment with the three different resins mentioned above in the desired manner. A reduction in the content in the solutions merely by treatment with the neutral adsorber resins according to the invention does not result in the requisite purification in a process to be carried out on an industrial scale, since the adsorption capacity of these resins for organic constituents is limited and it would not be possible to carry out a corresponding purification in an economical manner. By contrast, a combination consisting of purification by means of a preferably strongly basic anion exchanger resin, a nonionic adsorber resin and a specific neutral adsorber resin gives an excellent purification result.

Hydrogen peroxide solutions, which may have been pre-purified by distillation, can be further purified either by successive contact with the exchanger resin and the various adsorber resins by mixing in separate fluidized beds, but preferably by contact with the corresponding resins in packed columns. The flow rate of the hydrogen peroxide solutions should be set so that the content of carbon and of the ionogenic impurities in the eluate does not exceed the maximum amount that can be tolerated. Flow densities of from 0.2 to 1.0 l/h cm$^2$, in particular from 0.5 to 0.7 l/h cm$^2$, are advantageously set.

The purified hydrogen peroxide flowing out of the adsorption column is collected in a suitable container. If the further purification is carried out in suitable fluidized beds, the hydrogen peroxide solution is separated off by filtration and collected in a suitable container. However, the residence time here should be set so that although adsorption of undesired impurities takes place, reactions with the resins do not. It has been found that under suitable conditions, i.e. at a temperature of from 0 to 20° C., preferably between 0 and 5° C., at atmospheric pressure and a residence time of the hydrogen peroxide solutions of between 0.008 and 20.0 min, good further purification results are obtained, but at the same time no reaction with the exchanger resins is observed on the basis of changes in the oxygen content of the hydrogen peroxide solutions or on the basis of warming.

The successive treatment with different resins can be carried out in any desired sequence. Particularly good results are achieved owing to the adsorption capacities if the neutral adsorber resin is employed in the final purification step. However, very particularly good results are achieved if the sequence anion exchanger resin, nonionic adsorber resin and subsequently neutral adsorber resin is observed. This sequence is particularly important since the adsorption capacity of the neutral adsorbent would be the limiting factor in the process and complex optimization of the volume flow rates in the various purification steps and the ratio of the column volumes to one another would be necessary. However, if the columns are connected one after the other in the preferred manner, this work is superfluous. In particular if the treatment with the neutral adsorber resin is carried out last, this process parameter is unproblematic.

Strongly basic anion exchanger resins which can be employed are those based on styrene-divinylbenzene. For example, a corresponding resin is commercially available under the trade name Amberlyst A-26® (manufacturer Rohm & Haas). The active groups in this resin are —$N(CH_3)_2$.Cl. Further resins containing the same active groups are Amberlyst A-15®, Amberlyst A-21® and Amberlyst A-27®. Other suitable resins are Amberjet® 4200 Cl, Amberjet® 4400 Cl, Amberlite® IRA 402 Cl, Amberlite® IRA 404 Cl, Amberlite® IRA 900 Cl, Amberlite® IRA 904 Cl, Amberlite® IRA 400 Cl, Amberlite® IRA 410 Cl, Amberlite® IRA 420 Cl, Amberlite® IRA 440 Cl, Amberlite® IRA 458 and Amberlite® 16766. Likewise suitable are the weakly basic anion exchanger resins IRA-35, IRA-93, IRA-94 and IRA-68 sold under the trade name Amberlite®. It is also possible to employ the anion exchanger resins commercially available under the names Dowex, Diaion Type I and Type II, and Duolite, which may be either strongly or weakly basic.

Although, according to prevailing opinion, the functional groups of the said anion exchangers are oxidatively attacked by hydrogen peroxide solutions, experiments have shown that this can be completely or virtually completely prevented by setting suitable operating parameters. Depending on the solution to be treated, this can take place by setting a high volume flow rate and/or by corresponding cooling. If necessary, the process is carried out with cooling to about 0° C. However, it has been found that this is usually only necessary if solutions with a relatively high content have to be further purified. In the case of further purification of solutions in the lower concentration range, this is superfluous since firstly reactions can be kept at a relatively low level or prevented by setting a suitable volume flow rate, and secondly local temperature changes can be suppressed.

Nonionic adsorber resins which can be employed in the process according to the invention are those based on styrene-divinylbenzene having a macroporous structure and a large aromatic surface area. Corresponding resins are free from constituents that can be washed out, such as, for example, monomers or polymerization aids. These adsorbents have no ionic functional groups and are thus completely nonionic hydrophobic polymers whose adsorptive properties are based exclusively on the macroporous structure, the wide range of pore sizes, the unusually large surface area and the aromatic nature of this surface. These adsorbents are thus clearly distinguished from cation and anion exchangers, which, owing to their functional groups present on the surface, are very sensitive to oxidation. Nonionic adsorber resins adsorb and liberate ionic species through hydrophobic and polar interactions, i.e. they have high affinity to hydrophobic organic substances, but only low affinity to hydrophilic substances, such as water or hydrogen peroxide.

Corresponding resins are marketed commercially, for example, under the names Amberlite XAD-4®, a hydrophobic polyaromatic resin, Amberlite XAD-2® and Amberlite XAD-16®, likewise a hydrophobic polyaromatic resin, the moderately polar acrylic resins Diaion HP2MG and Diaion HP2MG and Diaion HP22SS®, a more finely divided version of specification HP20. These adsorber resins have continuous polymer phases and particularly regular pores. They are stable in pH ranges from 0 to 14 and to temperatures of up to 250° C. Under process conditions, these resins are active both at ambient temperatures, i.e. at temperatures of from 20 to 30° C., and at lower temperatures, such as, for example, 0° C. or lower.

The successive treatment with a basic anion exchanger resin and a nonionic adsorber resin enables virtually complete removal of polar and optionally ionic impurities from hydrogen peroxide solutions while protecting the resins employed to the greatest possible extent.

Suitable neutral adsorber resins are, for example, those based on carbonized styrene-divinylbenzene resins having a highly macroporous structure and a moderate surface area. Such resins are, for example, commercially available under the trade name Ambersorb®. Ambersorb® 563, Ambersorb® 564, Ambersorb® 572, Ambersorb® 575, Ambersorb® 600 and Ambersorb® 1500 can be employed in the process according to the invention. These different specifications are carbonized adsorbents prepared from highly sulfonated, macroporous styrene-divinylbenzene ion exchanger resin which has been pyrolyzed in a special process. As a consequence of their preparation process, corresponding adsorbers have uniform porosity, constant hydrophobic properties and excellent mechanical stabilities.

Experiments have shown that only the combination of the purification steps with the described treatment with neutral adsorber resins in the final step with in each case one treatment with anion exchanger resins and one with nonionic adsorber resins is suitable for reducing the content of organic impurities (TOC) in hydrogen peroxide solutions to levels which satisfy the high quality requirements of the semiconductor industry, i.e. to TOC values of <5 ppm, better <1 ppm.

In this connection, it has also been found that it is precisely the particular properties of the neutral adsorber resins that are responsible for the reduction in the content of organic impurities.

The difference between nonionic and neutral adsorber resins will be made clear in an illustrative manner in the following table using the example of the nonionic adsorber resin Amberlite XAD-4 and the neutral adsorber resin Ambersorb 563:

TABLE 1

| Name | Nonionic adsorber resin | Spec. neutral adsorber resin |
| --- | --- | --- |
| Example | Amberlite XAD 4 | Ambersorb 563 |
| Matrix | Styrene-DVB | Styrene-DVB; post-treated by pyrolysis |
| Surface area $m^2/g$ | 750 | 550 |
| Porosity g/ml | 0.5 | 0.6 |
| Micropore/macropore ratio | >1 | 1 |

Special neutral adsorber resins which can be employed in the process according to the invention thus have the following product properties which distinguish them from conventional nonionic adsorber resins as follows:

high macroporosity, where the micropore:macropore ratio can adopt a value of up to 1, and the porosity is >0.55 g/ml at a surface area/weight unit ratio of less than 600 $m^2/g$ excellent mechanical stability and chemical resistance due to the relatively high proportion of macropores, the adsorber resin is more accessible (more effective) to relatively high-molecular-weight organic components.

Before use of the exchanger and adsorber resins in the process according to the invention, it is advisable to free the resins from impurities as a consequence of the preparation by means of suitable, pure solvents known to the person skilled in the art for this purpose, since impurities of this type could in some cases decompose hydrogen peroxide. For pre-washing nonionic adsorber resins, it is possible to use, for example, lower alcohols, preferably methanol. Anion exchanger resins that can be employed in accordance with the invention can, for example, be pre-washed with 2-propanol and subsequently ultrapure water, while neutral adsorber resins can be pre-washed with steam and subsequently ultrapure water.

The process according to the invention can be carried out in batch operation, in which case the exchanger and adsorber resins used are regenerated each time a certain amount of hydrogen peroxide solution has been further purified. However, it is also possible to carry out the process continuously, for example by columns of the same charging being present in parallel to the columns currently being used and which can be switched to by redirecting the volume flow on saturation with the impurities to be removed.

In this way, each column can be regenerated individually, the volume flow does not have to be interrupted, and no wasted running times occur. The limiting factor is no longer the adsorption capacity of the resins employed.

The combinations of anion exchanger resin and adsorber resins given below in Table 1 are highly suitable for carrying out the process according to the invention. The combinations shown are given by way of example and should not be regarded as limiting for the present invention.

TABLE 2

| Process | Step 1: Anion exchanger resin | Step 2: Nonionic adsorber resin | Step 3: Neutral adsorber resin |
|---|---|---|---|
| Rohm & Haas product name | Amberlyst ® A-26 | Amberlite ® XAD-2 | Ambersorb ® 563 |
| | Amberlyst ® A-27 | Amberlite ® XAD-4 | Ambersorb ® 564 |
| | Amberjet ® 4200Cl | Amberlite ® XAD-16 | Ambersorb ® 572 |
| | Amberjet ® 4400Cl | | Ambersorb ® 575 |
| | Amberlite ® IRA402Cl | | Ambersorb ® 600 |
| | Amberlite ® IRA404Cl | | Ambersorb ® 1500 |

The process according to the invention is carried out under conditions and using methods which are known per se to the person skilled in the art. Good purification results are achieved using columns which have a ratio between column height and column diameter of between 7.5:1 and 2.5:1, preferably between 6:1 and 4:1, particularly preferably 5:1, and through which from 3 to 5 times the bed volume of hydrogen peroxide solution flows per hour. However, the process can also be carried out in columns which have heights of from 10 to 200 cm and diameters of from 1 to 2 cm. For purification of relatively large amounts, however, columns having heights of from 2.5 to 4 m and diameters of from 0.50 to 0.8 m are particularly suitable.

An important factor for the success of the purification process according to the invention is that all equipment and containers employed during the purification consist of suitable materials so that the highly pure hydrogen peroxide is not subsequently re-contaminated by, for example, metal ions, etc., from the containers and piping. Suitable materials have proven to be, in particular, borosilicate glass, polytetrafluoroethylene, polyvinylidene fluoride and high-pressure polyethylene.

The present invention provides a particularly simple and advantageous process for the purification of hydrogen peroxide for applications in micro-electronics. The process according to the invention is distinguished, in particular, by the fact that even very low contents of organic impurities in hydrogen peroxide solutions can be reduced very effectively and in addition particularly interfering cations, such as Na, K, Mg, Al, Ca, Fe, Zn and Cu, are also removed virtually completely.

The hydrogen peroxide solutions further purified by the process according to the invention have increased stabilities and conform to today's purity requirements for the production of highly integrated chips.

By means of the description of the invention given here, the person skilled in the art will readily find it possible to prepare highly pure hydrogen peroxide solutions which meet the high requirements for use in today's chip production methods. The examples given below are intended to serve for better understanding of the present invention, but are not suitable for restricting the invention thereto.

Working Examples, Methods and Results:

In order to demonstrate the efficiency of the process according to the invention, the following aqueous hydrogen peroxide solutions and exchanger and adsorption resins were employed and the following analytical methods were used in the following examples:

Hydrogen Peroxide Solutions:
Origin: Merck KGaA, anthraquinone process ("autoxidation process") Batch KD09971042
Concentration: 50%±1% or 30%±1%
Amount: 2.5 l
Adsorber Resins:

| Anion exchanger resin: | Amberlyst ® A 26 |
|---|---|
| Nonionic adsorber resin: | Amberlite ® XAD-4 |
| Neutral adsorber resin: | Ambersorb ® 563 |
| Pretreatment: | All resins were rinsed with ultrapure water for 8 hours before use |

Analytical Methods:
TOC determination using Shimadzu TOC 5000 (measurement method based on complete decomposition of the sample on a platinum catalyst at elevated temperature). The carbon dioxide formed therefrom is determined in total by means of an infrared spectrometer. Cations and anions were not determined specifically.

EXAMPLE 1

Flow rate: 1.0 l/h
Flow density: 0.3 l/h cm$^2$

TABLE 3

| Stage: adsorber | TOG [ppm] |
|---|---|
| Before 1st stage (reference $H_2O_2$ 50%) | 38.0 |
| 1st stage: Amberlyst ® A 26 | 23.7 |
| 2nd stage: Amberlite ® XAD-4 | 47 |
| 3rd stage: Ambersorb ® 563 | 2.4 |

The experiment confirms the excellent mechanical stability and chemical resistance of the 3rd stage, even to relatively highly concentrated hydrogen peroxide solutions, and shows that the 3rd stage achieves a further significant purification effect in the TOC region <5 ppm.

EXAMPLE 2

Flow rate: 1.0 l/h
Flow density: 0.3 l/h cm$^2$

TABLE 4

| Stage: adsorber | TOC [ppm] |
|---|---|
| After 1st stage (reference $H_2O_2$ 30%) | 11.5 |
| Only Amberlite ® XAD-4 | 1.6 |
| Only Ambersorb ® 563 | 1.1 |
| First Amberlite ® XAD-4, then Ambersorb ® 563 | 0.4 |

This experiment shows that the nonionic adsorber resin and the special neutral adsorber resin have different selectivities in the reduction in the concentration of relatively high-molecular-weight organic components. Only when the two adsorber resins are used in combination is the content of organic components in hydrogen peroxide solutions (TOC) reduced to less than 1 ppm.

What is claimed is:
1. A process for purifying a hydrogen peroxide solution having a concentration of 5–59%, comprising treating the solution
   a) with an anion exchanger resin,
   b) with a nonionic adsorber resin of a hydrophobic aromatic, crosslinked polymer having a macroporous structure, and c) with a neutral adsorber resin of a styrene-divinylbenzene resin having a macroporous structure, made by a pyrolysis treatment of the resin, with the proviso that the treatment with the adsorber or exchanger resin can be carried out in any desired sequence except the treatment with the neutral adsorber resin takes place in the final step.

2. A process according to claim 1, wherein the anionic exchanger resin is a weakly or strongly basic styrene-divinylbenzene resin containing quaternary ammonium groups as functional groups or a weakly or strongly basic styrene-divinylbenzene containing tertiary amino groups as functional groups.

3. A process according to claim 1, wherein the nonionic adsorber resin is a styrene-divinylbenzene resin having a macroporous structure.

4. A process according to claim 1, further comprising passing the hydrogen peroxide solution through columns for performing treatment a), b), and c) connected in series at flow density of 0.2–1.0 l/h cm$^2$.

5. A process according to claim 1, further comprising passing the hydrogen peroxide solution through fluidized beds for performing treatment a), b), and c) connected in series with a residence time of from 0.008–20.0 min.

6. A process according to claim 1, wherein the process is carried out at 15–25° C.

7. A process according to claim 1, wherein the process is carried out continuously.

8. A process according to claim 1, wherein the process is carried out in a batch operation.

9. A process according to claim 1 wherein the process is carried out at 0–20° C.

10. A process according to claim 1, further comprising passing the hydrogen peroxide through columns for performing treatment a), b), and c) connected in series at 0.5–0.7l/h cm$^2$.

11. A process according to claim 1, wherein the process is carried out at 20° C.

12. A process according to claim 1, wherein the process is carried out at 0–10° C.

13. A process according to claim 1, wherein the concentration of organic impurities in the solution is reduced to less than 5 ppm.

14. A process according to claim 1, wherein the process is conducted at atmospheric pressure.

15. A process according to claim 1, wherein the concentration of organic impurities in the solution is reduced to less than 1 ppm.

16. A process according to claim 1, wherein the neutral adsorber resin has a micropore:macropore ratio of up to 1 and a porosity >0.55 g/ml at a surface area/weight unit ratio of less than 600 m$^2$/g.

17. A process according to claim 1, further pre-washing the exchanger and adsorber resins.

18. A process to claim 4, wherein the ratio between column height and column diameter for each column is between 7.5:1–2.5:1.

19. A process according to claim 1, wherein the equipment used in the process comprises borosilicate glass, polytetrafluoroethylene, polyvinylidene fluoride or high-pressure polyethylene.

20. A process according to claim 1, wherein the treatment is performed in the order of a), b) and c).

* * * * *

UNITED STATES PATENT AND TRADEMARK OFFICE
CERTIFICATE OF CORRECTION

PATENT NO. : 6,939,527 B2 Page 1 of 1
DATED : September 6, 2005
INVENTOR(S) : Dietmar Oeter et al.

It is certified that error appears in the above-identified patent and that said Letters Patent is hereby corrected as shown below:

Column 9,
Line 2, "structure," should read -- structure --.
Line 19, "at" should read -- a --.
Line 31, "claim 1 wherein" should read -- claim 1, wherein --.

Column 10,
Line 4, "0.7l/h" should read -- 0.7 l/h --.
Line 21, "further pre-washing" should read -- further comprising pre-washing --.

Signed and Sealed this

Seventeenth Day of January, 2006

JON W. DUDAS
*Director of the United States Patent and Trademark Office*